United States Patent
He et al.

(10) Patent No.: US 11,888,316 B2
(45) Date of Patent: Jan. 30, 2024

(54) METHOD AND SYSTEM OF PREDICTING ELECTRIC SYSTEM LOAD BASED ON WAVELET NOISE REDUCTION AND EMD-ARIMA

(71) Applicant: WUHAN UNIVERSITY, Hubei (CN)

(72) Inventors: Yigang He, Hubei (CN); Xiaoxin Wu, Hubei (CN); Jiajun Duan, Hubei (CN); Chaolong Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 333 days.

(21) Appl. No.: 17/168,116

(22) Filed: Feb. 4, 2021

(65) Prior Publication Data

US 2022/0045509 A1    Feb. 10, 2022

(30) Foreign Application Priority Data

Aug. 5, 2020    (CN) .......................... 202010777451.1

(51) Int. Cl.
*H02J 3/00* (2006.01)
*G06F 30/20* (2020.01)
(Continued)

(52) U.S. Cl.
CPC .............. *H02J 3/003* (2020.01); *G06F 17/18* (2013.01); *G06F 30/20* (2020.01); *G06F 30/27* (2020.01);
(Continued)

(58) Field of Classification Search
CPC .. G06F 17/18; G06F 2119/06; G06F 2119/10; G06F 30/20; G06F 30/27;
(Continued)

(56) References Cited

U.S. PATENT DOCUMENTS 10,001,792 B1 *    6/2018    Packer .................. G06Q 50/06
2010/0023307 A1 *    1/2010    Lee ..................... G06F 18/2321
703/7

(Continued)

FOREIGN PATENT DOCUMENTS

CN    102270279 A  *  12/2011
CN    103279813 A  *  9/2013
(Continued)

*Primary Examiner* — Yoshihisa Ishizuka
(74) *Attorney, Agent, or Firm* — JCIPRNET

(57) ABSTRACT

A method and a system of predicting an electric system load based on wavelet noise reduction and empirical mode decomposition-autoregressive integrated moving average (EMD-ARIMA) are provided. The method and the system belong to a field of electric system load prediction. The method includes the following steps. Raw load data of an electric system is obtained first. Next, noise reduction processing is performed on the load data through wavelet analysis. The noise-reduced load data is further processed through an EMD method to obtain different load components. Finally, ARIMA models corresponding to the different load components are built. Further, the ARIMA models are optimized through an Akaike information criterion (AIC) and a Bayesian information criterion (BIC). The load components obtained through predicting the different ARIMA models are reconstructed to obtain a final prediction result, and accuracy of load prediction is therefore effectively improved.

11 Claims, 7 Drawing Sheets

(51) Int. Cl.
*G06F 17/18* (2006.01)
*G06F 30/27* (2020.01)
*G06Q 10/04* (2023.01)
*G06F 119/06* (2020.01)
*G10L 21/0232* (2013.01)

(52) U.S. Cl.
CPC .......... *G06Q 10/04* (2013.01); *G10L 21/0232* (2013.01); *G06F 2119/06* (2020.01)

(58) Field of Classification Search
CPC ... G06F 30/367; G06Q 10/04; G10L 21/0232; H02J 3/003; Y04S 10/50
See application file for complete search history.

(56) References Cited

U.S. PATENT DOCUMENTS

| 2013/0080378 | A1* | 3/2013 | Huang | G06F 17/18 |
| | | | | 706/54 |
| 2017/0285095 | A1* | 10/2017 | Yanagi | G01R 31/2601 |
| 2019/0164564 | A1* | 5/2019 | Kirsch | G10L 21/0216 |

FOREIGN PATENT DOCUMENTS

| CN | 104063569 | A | * | 9/2014 | | |
| CN | 104820876 | A | * | 8/2015 | | |
| CN | 104931040 | A | * | 9/2015 | ........... | G01C 21/005 |
| CN | 108561119 | A | * | 9/2018 | ............. | E21B 47/00 |
| CN | 110543971 | A | * | 12/2019 | | |
| CN | 111985361 | A | * | 11/2020 | ............. | G06F 17/18 |

* cited by examiner

METHOD AND SYSTEM OF PREDICTING ELECTRIC SYSTEM LOAD BASED ON WAVELET NOISE REDUCTION AND EMD-ARIMA

CROSS-REFERENCE TO RELATED APPLICATION

This application claims the priority benefit of China application serial no. 202010777451.1, filed on Aug. 5, 2020. The entirety of the above-mentioned patent application is hereby incorporated by reference herein and made a part of this specification.

BACKGROUND

Technical Field

The disclosure relates to a field of electric system load prediction, and in particular, relates to a method and a system of predicting an electric system load based on wavelet noise reduction and empirical mode decomposition-autoregressive integrated moving average (EMD-ARIMA).

Description of Related Art

Prediction of a power system short-term load is the core of a smart grid integrated intelligent energy management system. An accurate short-term load prediction model may be used to facilitate reasonable planning of ongoing grid operations under effective resource management. A random, non-stationary, and nonlinearity load curve may bring challenges to the precise modeling of short-term load prediction.

At present, a large number of researches related to power system load prediction are provided, including the autoregressive integrated moving average (ARIMA) model, the Kalman filtering prediction, the Markov forecasting, the support vector machine (SVM), the artificial neural network (ANN), the long short term memory network (LSTM), and so on. Nevertheless, these single prediction methods have their own shortcomings. Taking ARIMA for example, acting as a classic time series analysis method, in ARIMA, the connection between time series data is fully-considered, and ARIMA is also an important tool for time series prediction. This model is suitable for processing stationary data, but the electric system load exhibits uncertain characteristics. Although the load may be stabilized through the difference method, there is still room for improvement for the ARIMA model when facing considerably fluctuating load data. The filter prediction model may be used to effectively remove Gaussian noise and non-Gaussian noise, and excessively less calculation amount is required, but the system model is required to be manually given. When the system model is inaccurate, the prediction effect may drop, so that it is difficult for such model to be widely used. The conventional artificial intelligence algorithms may not be used to effectively capture the time series relevance of sequence data and thus are not ideal for time series data prediction. As an improved algorithm of RNN, LSTM is one of the current research hot spots of deep learning. But research shows that LSTM has more advantages in long-term load prediction. Moreover, the training time of the deep learning method is long, the convergence speed is slow, and the model generalization ability needs to be further tested.

In some researches, the advantages of different algorithms begin to be fully-used and are organically combined to further improve prediction precision. For instance, the Kalman equation of state and measurement equation are established based on the ARIMA model, and the Kalman filtering algorithm is finally used to establish the prediction model. Nevertheless, with lack of comparison with other methods, it is difficult to see the advantage of prediction precision. In the empirical mode decomposition (EMD), the original load series is decomposed into a series of sub-series, and the kernel extreme learning machine (KELM) that optimizes the weights of the output layer through particle swarm optimization (PSO) is used to establish a prediction model. Interval structure of each series is built, and favorable prediction precision is achieved. However, a considerable amount of time is needed for PSO optimization and KELM training, and when the amount of data is small, the algorithm is prone to overfitting.

Besides, in most studies on load prediction, online monitoring data is generally used directly. With absence of cleaning and noise reduction of the data, it is difficult to ensure the reliability of the data, which also reduces the persuasiveness of the later prediction results. At present, in a small number of studies, the load data is preprocessed, aiming to further improve the precision of later predictions. For instance, the use of fuzzy information granulation and support vector machine for load prediction effectively reduces the interference of abnormal data on the final result. First, two time series models are used to match the raw data to detect the types of outliers. Next, the noise points and missing values that exist are repaired and processed, and then a prediction model is built based on SVM. However, the prediction method used lacks further optimization.

SUMMARY

In view of the above defects or improvement requirements of the related art, the disclosure provides a method and a system of predicting an electric system load based on wavelet noise reduction and empirical mode decomposition-autoregressive integrated moving average (EMD-ARIMA) through which accuracy of load prediction is effectively improved.

To realize the above purpose, according to one aspect of the disclosure, a method of predicting an electric system load based on wavelet noise reduction and EMD-ARIMA is provided, and the method includes the following steps.

(1) Electric load data of an electric system corresponding to different moments is obtained. When the electric load data is provided at unequal intervals, interpolation is performed on the electric load data to obtain the electric load data provided at equal intervals.

(2) Noise reduction processing is performed on the electric load data through wavelet analysis.

(3) The noise-reduced electric load data is further processed through an EMD method to obtain different load components.

(4) ARIMA models corresponding to the different load components are built.

(5) The ARIMA model corresponding to each of the load components is optimized through an Akaike information criterion (AIC) and a Bayesian information criterion (BIC).

(6) The load components obtained by predicting the optimized different ARIMA models are reconstructed to obtain a final prediction result.

Preferably, the electric load data provided at equal intervals of the electric system is: data=$\{a_1, a_2, \ldots, a_i\}$ $i \in [1, K]$, where K is K pieces of load data corresponding to K moments, and $a_i$ is a value of an $i^{th}$ point in the load data.

Preferably, step (2) includes the following steps.

A wavelet is selected, a decomposition level is determined, and then decomposition calculation is performed. A threshold is selected for a high-frequency coefficient under each decomposition scale for soft threshold quantization. One-dimensional wavelet reconstruction is performed based on a lowest low-frequency coefficient of wavelet decomposition and a high-frequency coefficient of each layer.

Preferably, data obtained after wavelet decomposition and noise reduction are performed is: $x(t)=\{x_1, x_2, \ldots, x_t\}$ $t \in [1, K]$, where K is K pieces of load data corresponding to K moments, and $x_t$ is a value of a $t^{th}$ point in the load data.

Preferably, step (3) includes the following steps.

(3.1) All maximum points and all minimum points in an original series x(t) are identified. An upper envelope $x_{up}(t)$ and a lower envelope $x_{low}(t)$ are fit and formed by adopting a cubic spline interpolation method, and an envelope mean m(t):

$$m(t) = \frac{x_{up}(t) + x_{low}(t)}{2}$$

of the upper envelope and the lower envelope is calculated.

(3.2) A difference value between the original series x(t) and the envelop mean m(t) is calculated and marked as: h(t): h(t)=x(t)−m(t).

(3.3) Whether h(t) satisfies intrinsic mode function (IMF) constraint conditions is determined, h(t) is treated as a new input series if no is determined, and step (3.1) to step (3.3) are repeatedly performed until the IMF constraint conditions are satisfied. h(t) is treated as a first IMF component if yes is determined, h(t) is marked as $c_1$ (t)=h(t), $c_1$(t) is separated from the original series x(t), and a residual component $r_1$(t): $r_1$ (t)=x(t)−$c_1$(t) is obtained.

(3.4) The residual component $r_1$(t) is treated as a new original series, and step (3.1) is executed again until other IMF components and one residual component are obtained. A final result of EMD is represented as r(t)=x(t)−$c_i$(t), where $c_i$(t) is an $i^{th}$ IMF component, and r(t) is a final residual component representing a trend term of the original series.

Preferably, the IMF constraint conditions are: (a) in an entire series data segment, a number of extreme points and a number of zero-crossing points are required to be identical or be different from each other at most by one, and (b) at any point, a mean of an upper envelope determined by a maximum value and a lower envelope determined by a minimum value is zero.

Preferably, an ARIMA(p,d,q) model is a combination of an AR(p) model and an MA(q) model. The ARIMA(p,d,q) model is represented as:

$$x_t = \mu + \sum_{i=1}^{p} \gamma_i x_{t-1} + \xi_t + \sum_{i=1}^{q} \theta_i \xi_{t-i},$$

where $x_t$ is a current value, μ is a constant term, p is an order, $\gamma_i$ is an autocorrelation coefficient, $\xi_t$ is an error, q is an order, $\theta_i$ is a parameter eliminating random fluctuation, $x_{t-i}$ is a value at a moment t−i, $\xi_{t-i}$ is an error at the moment t−i.

Preferably, step (5) includes the following steps.

A difference order d value is determined corresponding to each of the ARIMA models according to a plurality of differences for each of the ARIMA models, and each of the ARIMA models is converted into a corresponding autoregressive moving average (ARMA) model.

Ordering is performed on a load component corresponding to each of the ARMA models through an autocorrelation function (ACF) and a partial autocorrelation function (PACF) for each of the ARMA models. A plurality groups of p and q values are obtained. The plurality groups of the ARMA models are optimized through AIC and BIC corresponding to the plurality groups of the ARMA models. The ARIMA model corresponding to each of the load component is obtained. If a value calculated through the two parameters AIC and BIC decrease, meaning that the model is suitable.

According to another aspect of the disclosure, a system of predicting an electric system load based on wavelet noise reduction and EMD-ARIMA is provided, and the system includes a data processing module, a feature decomposition module, an ARIMA prediction model building module, an ARIMA model optimization module, a component prediction module, and a prediction module.

The data processing module is configured to obtain load data of an electric system and performs wavelet noise reduction processing on the load data.

The feature decomposition module is configured to perform EMD on the wavelet noise-reduced load data and obtains different IMF components and a residual component of the load data.

The ARIMA prediction model building module is configured to build ARIMA models for the different IMF components and the residual component of the load data obtained through EMD.

The ARIMA model optimization module is configured to optimize the ARIMA models of the different IMF components and the residual component.

The component prediction module is configured to perform ARIMA prediction on the different IMF components and the residual component obtained through optimization.

The prediction module is configured to synthesize results predicted by the component prediction module to obtain a final load prediction result.

According to another aspect of the disclosure, the disclosure further provides a computer readable storage medium storing a computer program. The computer program performs any step of the method when being executed by a processor.

In general, the above technical solutions provided by the disclosure have the following beneficial effects compared with the related art.

At present, raw data is seldom preprocessed in the load prediction research. Nevertheless, in the disclosure, noise reduction is performed on load data through the wavelet analysis, and interference generated by bad data on prediction may be reduced in this way. Further, an EMD-ARIMA prediction model is built. Stationary processing is performed on a nonlinear and non-stationary load time series through EMD to obtain a plurality of components. ARIMA models are built for the different components, and the ARIMA models are optimized through AIC and BIC. Reconstruction is finally performed to obtain a load prediction result, and accuracy of load prediction is therefore effectively improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A is raw load data, and FIG. 3B is the wavelet-denoised load data.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

The disclosure provides a method and a system of predicting an electric system load based on wavelet noise reduction and empirical mode decomposition-autoregressive integrated moving average (EMD-ARIMA). Further, prediction of daily load data of a specific region is treated as a specific example for description. Nevertheless, the disclosure may not only be applied to load prediction of such region but may also be applied to prediction fields.

Raw load data of an electric system is obtained first. Next, noise reduction processing is performed on the load data through wavelet analysis. The noise-reduced load data is further processed through an EMD method to obtain different load components. Finally, ARIMA models corresponding to the different load components are built. Further, the ARIMA models are optimized through an Akaike information criterion (AIC) and a Bayesian information criterion (BIC). The load components obtained through predicting the different ARIMA models are reconstructed to obtain a final prediction result. At present, raw data is seldom preprocessed in the load prediction research. Nevertheless, in the disclosure, noise reduction is performed on load data through the wavelet analysis, and interference generated by bad data on prediction may be reduced in this way. Further, an EMD-ARIMA prediction model is built. Stationary processing is performed on a nonlinear and non-stationary load time series through EMD to obtain a plurality of components. ARIMA models are built for the different components, and the ARIMA models are optimized through an Akaike information criterion (AIC) and a Bayesian information criterion (BIC). Reconstruction is finally performed to obtain a load prediction result. A wavelet threshold denoising method requires less calculation and exhibits high processing efficiency and thus may be used to effectively improve precision of data processing, and accuracy of load prediction is therefore effectively improved.

Figure 1:
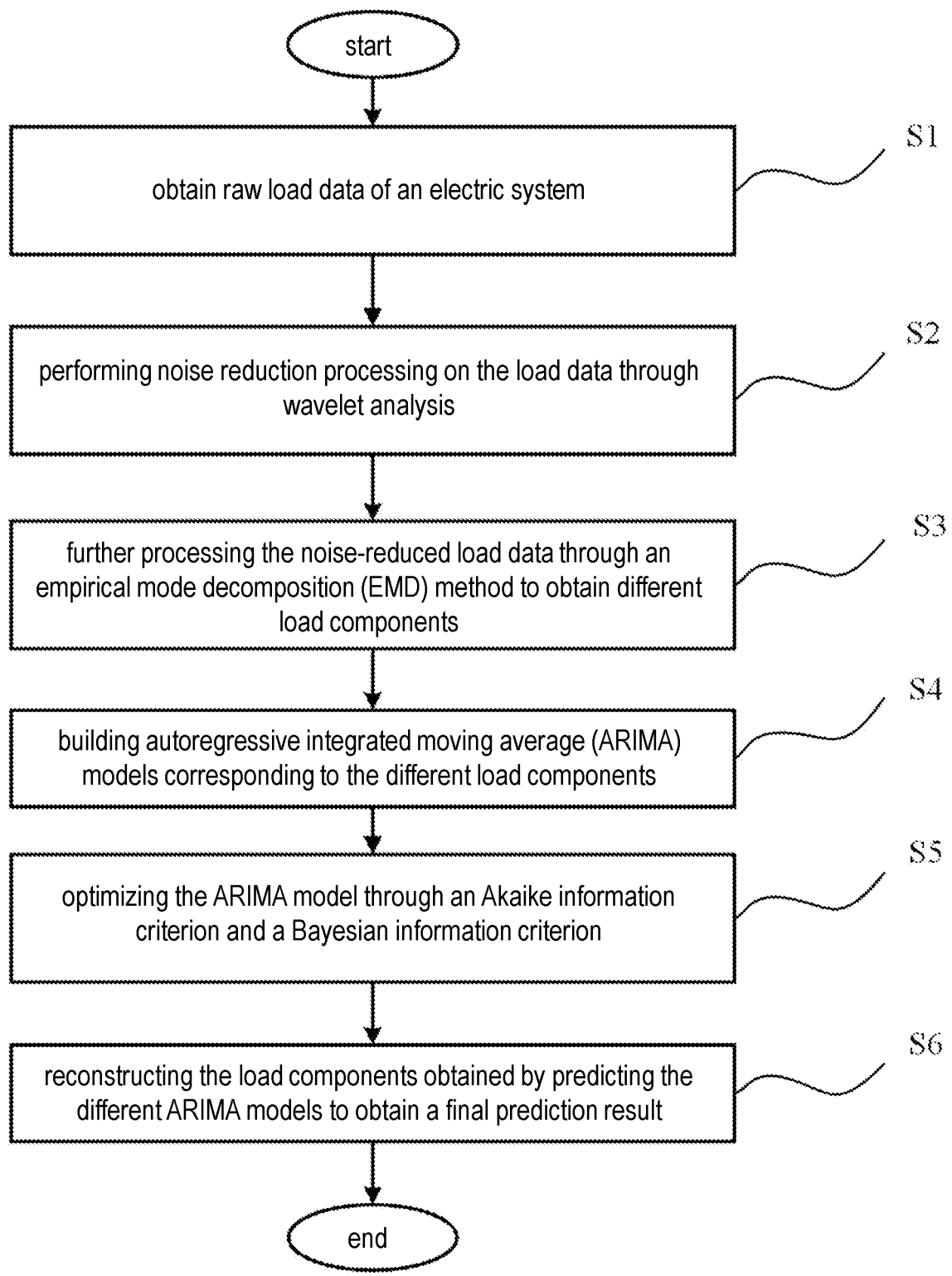
FIG. 1 is a schematic flow chart of a method of predicting an electric system load based on wavelet noise reduction and empirical mode decomposition-autoregressive integrated moving average (EMD-ARIMA) according to an embodiment of the disclosure.

As shown in FIG. 1, in the example of load prediction of such specific region, a schematic flow chart of a method of predicting an electric system load based on wavelet noise reduction and EMD-ARIMA according to an embodiment of the disclosure is provided, and the method includes the following steps.

In S1, electric load data of an electric system corresponding to different moments is obtained. This step may be skipped if the electric load data is provided at equal intervals. If the electric load data is provided at unequal intervals, interpolation is performed on the electric load data to obtain the electric load data provided at equal intervals.

In the embodiments of the disclosure, the electric load data is data of an electric system of a specific region in 2011. The electric load data is provided at equal intervals: data=$\{a_1, a_2, \ldots, a_i\}$ $i \in [1, K]$, where K is K pieces of load data corresponding to K moments, and $a_i$ is a value of an $i^{th}$ point in the load data.

In S2, noise reduction processing is performed on the electric load data through wavelet analysis.

Figure 2:
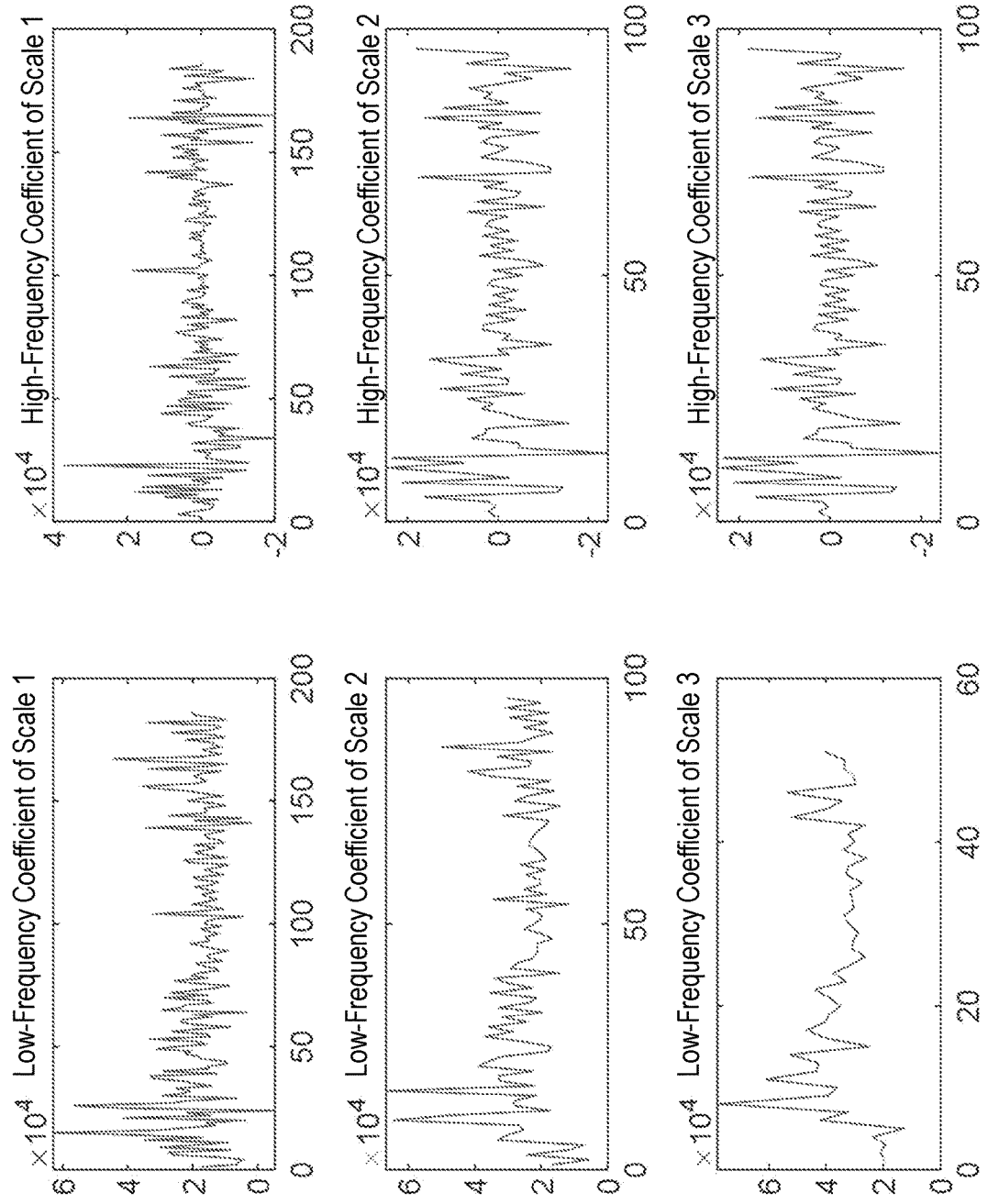
FIG. 2 provides graphs of wavelet decomposition results based on db4 according to an embodiment of the disclosure.

In the embodiments of the disclosure, a db4 wavelet is selected, the decomposition level is 3, and decomposition calculation is then performed. A threshold for a high-frequency coefficient under each decomposition scale is selected for soft threshold quantization. One-dimensional wavelet reconstruction is performed based on a lowest low-frequency coefficient of wavelet decomposition and a high-frequency coefficient of each layer. In a specific implementation process, a high-pass filter and a low-pass filter may be designed to respectively obtain the high-frequency coefficient and the low-frequency coefficient, and a length of data is halved every time the data is decomposed. Wavelet reconstruction is an inverse process of decomposition. Upsampling is performed first, that is, one 0 is inserted between every two numbers, convolution is performed together with a conjugate filter, and finally, convolution results are summed up. A signal is reconstructed using the coefficients of each layer. The final high-frequency coefficient and low-frequency coefficient of different scales are finally obtained as shown in FIG. 2.

Figure 3A:
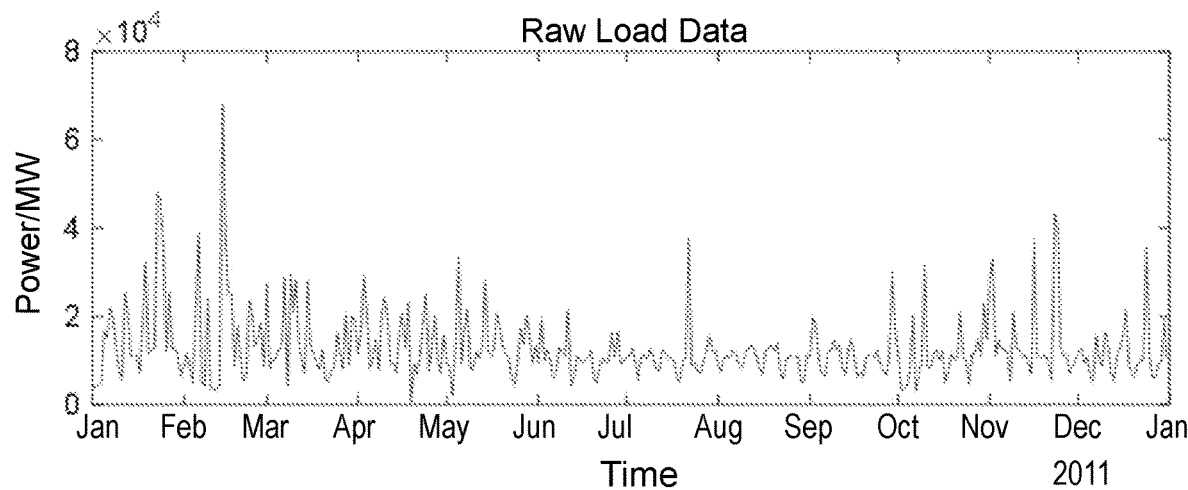
FIG. 3A to FIG. 3B provides graphs comparing data before and after wavelet noise reduction according to an embodiment of the disclosure, where
Figure 3B:
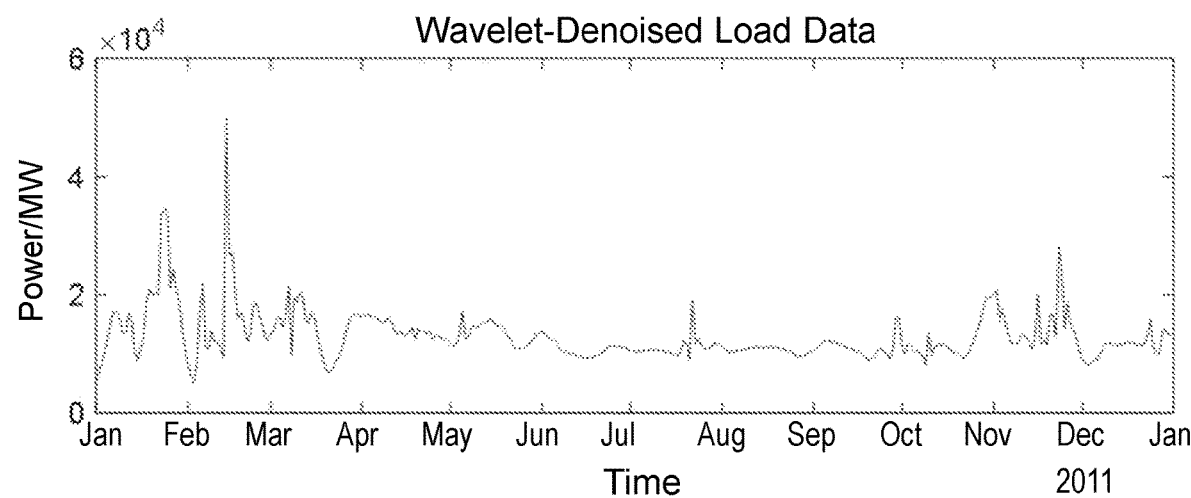

In the embodiments of the disclosure, data obtained after wavelet decomposition and noise reduction are performed is: x(t)=$\{x_1, x_2, \ldots, x_t\}$ $t \in [1, K]$, where K is K pieces of load data corresponding to K moments, and $x_t$ is a value of a $t^{th}$ point in the load data. FIG. 3 shows comparison of data before and after noise reduction, where (a) is the raw load data, and (b) is the wavelet-denoised load data.

In S3, the noise-reduced electric load data is further processed through an EMD method to obtain different load components.

In the embodiments of the disclosure, in the EMD method, it is assumed that any complex time signal is formed by a series of simple and independent intrinsic modal functions (IMFs). Each IMF component is required to satisfies the following constraint conditions: (a) in an entire series data segment, a number of extreme points and a number of zero-crossing points are required to be identical or be different from each other at most by one, and (b) at any point, a mean of an upper envelope determined by a maximum value and a lower envelope determined by a minimum value is zero.

In the embodiments of the disclosure, specific decomposition steps of a given load series include the following.

(1) All maximum points and all minimum points in an original series x(t) are identified, an upper envelope $x_{up}(t)$ of the maximum points and a lower envelope $x_{low}(t)$ of the minimum points are fit and formed by adopting a cubic spline interpolation method, and an envelope mean m(t):

$$m(t) = \frac{x_{up}(t) + x_{low}(t)}{2}$$

of the upper envelope and the lower envelope are calculated.

(2) A difference value between the original series x(t) and the envelop mean m(t) is calculated and marked as: h(t): h(t)=x(t)−m(t).

(3) Whether h(t) satisfies the IMF constraint conditions are determined, h(t) is treated as a new input series if no is determined, and step (1) to step (2) are repeatedly performed until the IMF constraint conditions are satisfied. h(t) is treated as a first IMF component if yes is determined, h(t) is marked as $c_1(t)$=h(t), $c_1(t)$ is separated from the original series x(t), and a residual component $r_1(t)$: $r_1(t)$=x(t)−$c_1$ (t) is obtained.

(4) The residual component $r_1(t)$ is treated as a new original series, and the stationary processing of step (1) to step (4) are repeated until other IMF components and one residual component are obtained. A final result of EMD may be represented as r(t)=x(t)−$c_i(t)$, where $c_i(t)$ is an $i^{th}$ IMF component, and r(t) is a final residual component representing a trend term of the original series.

Through the EMD method, different scales or trend components may be decomposed from the load series level by level. A series of sub-series components with different time scales are thereby formed, and the sub-series components exhibit improved stationarity and regularity compared to the original series, and enhanced prediction precision is therefore provided.

Figure 4:
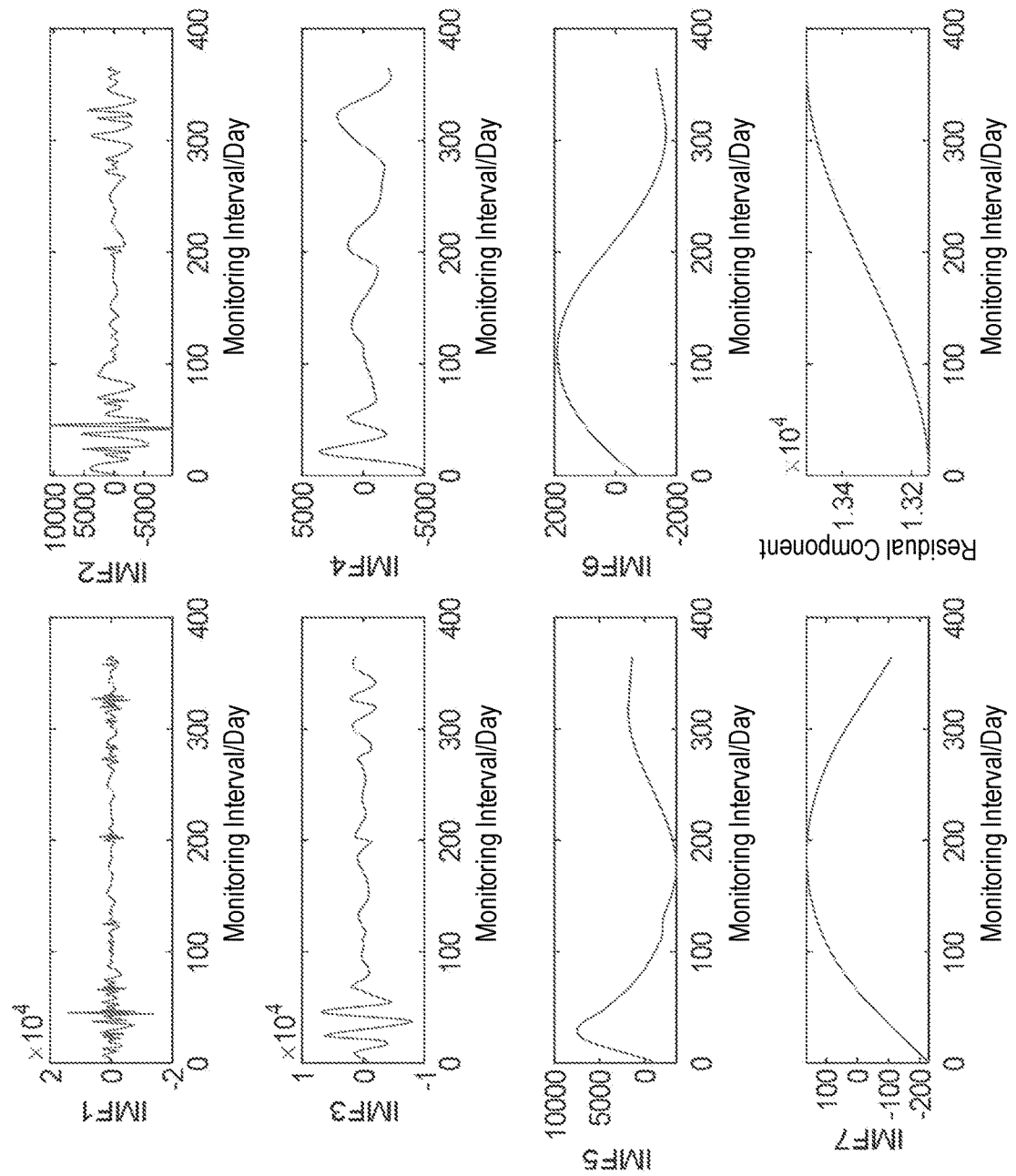
FIG. 4 provides graphs of EMD results of a wavelet noise reduced-load series according to an embodiment of the disclosure.

In the embodiments of the disclosure, EMD processing is performed on the wavelet noise-reduced load data, corresponding 7 groups of the IMF components and 1 group of the residual component are separated level by level, and the decomposition results are shown in FIG. 4.

It can be seen that after the EMD processing is performed, differences in levels of the load data are reduced, and changes are stabilized. Prediction may be performed through the ARIMA models.

In S4, ARIMA models corresponding to the different load components are built.

In the embodiments of the disclosure, an ARIMA(p,d,q) model is actually a combination of an AR(p) model and an MA(q) model. The "I" in ARIMA(p,d,q) means to perform difference processing on a non-stationary time series, and a parameter d in the ARIMA(p,d,q) model may be determined by the difference method.

AR(p) is an autoregressive model, and such model is a relationship of disturbance among a response $x_t$ of a variable at a moment t, responses $x_{t-1}$, $x_{t-2}$, ... at moments t−1, t−2, ..., and entering of the system at the moment t, which is not directly related to previous disturbance. The autoregressive model is required meet the stationarity requirements. The formula of a p-order autoregressive process is:

$$x_t = \mu + \sum_{i=1}^{p} \gamma_i x_{t-i} + \xi_t,$$

where $x_t$ is a current value, μ is a constant term, p is an order, $\gamma_i$ is an autocorrelation coefficient, and $\xi_t$ is an error.

An MA(q) model is a moving average model, and such model refers to lack of a direct relationship between the response $x_t$ of the variable at the moment t and the responses at the moments t−1, t−2, ... as well as a specific relationship with disturbance of entering of the system at the moments t−1, t−2, .... The moving average method may be used to effectively eliminate random fluctuation in prediction, and the random fluctuation refers to the accumulation of error terms in the autoregressive model. The formula of a q-order autoregressive process is:

$$x_t = \mu + \xi_t + \sum_{i=1}^{q} \theta_i \xi_{t-i},$$

where q is an order, $\xi_t$ is an error, and $\theta_i$ is a parameter eliminating random fluctuation.

ARIMA(p,d,q) is an autoregressive moving average model, and such model is a combination of autoregression and a moving average and refers to a direct relationship between the response $x_t$ of the variable at the moment t and the responses $x_{t-1}$, $x_{t-2}$, ... at the moments t−1, t−2, ... as well as a specific relationship with disturbance of entering of the system at the moments t−1, t−2, .... The formula is $$x_t = \mu + \sum_{i=1}^{p} \gamma_i x_{t-i} + \xi_t + \sum_{i=1}^{q} \theta_i \xi_{t-i},$$

In S5, the ARIMA models are optimized through AIC and BIC. If a value calculated through the two parameters AIC and BIC decrease, meaning that the model is suitable.

In the embodiments of the disclosure, a corresponding difference order d value is determined according to a plurality of differences for each of the ARIMA models, and each of the ARIMA models is converted into an autoregressive moving average (ARMA) model. Ordering is performed on an obtained stationary time series through an autocorrelation function (ACF) and a partial autocorrelation function (PACF). A plurality groups of p and q values are obtained. As such, the plurality groups of the models are optimized through AIC and BIC corresponding to the plurality groups of the models. The AIC formula is: AIC=−2 ln(L)+2k, and the BIC formula is: BIC=−2 ln(L)+ln(n)·k, where L is maximum likelihood under the model, n is a number of pieces of data, and k is a number of the variables in the model. Both AIC and BIC introduce penalty terms related to a number of model parameters, and the penalty term of BIC is greater than that of AIC. Taking into account a number of samples, when the number of samples is excessively large, precision of the model is effectively prevented from being excessively high, which may lead to excessive complexity of the model. The ARIMA models of the components may all be different.

Figure 5:
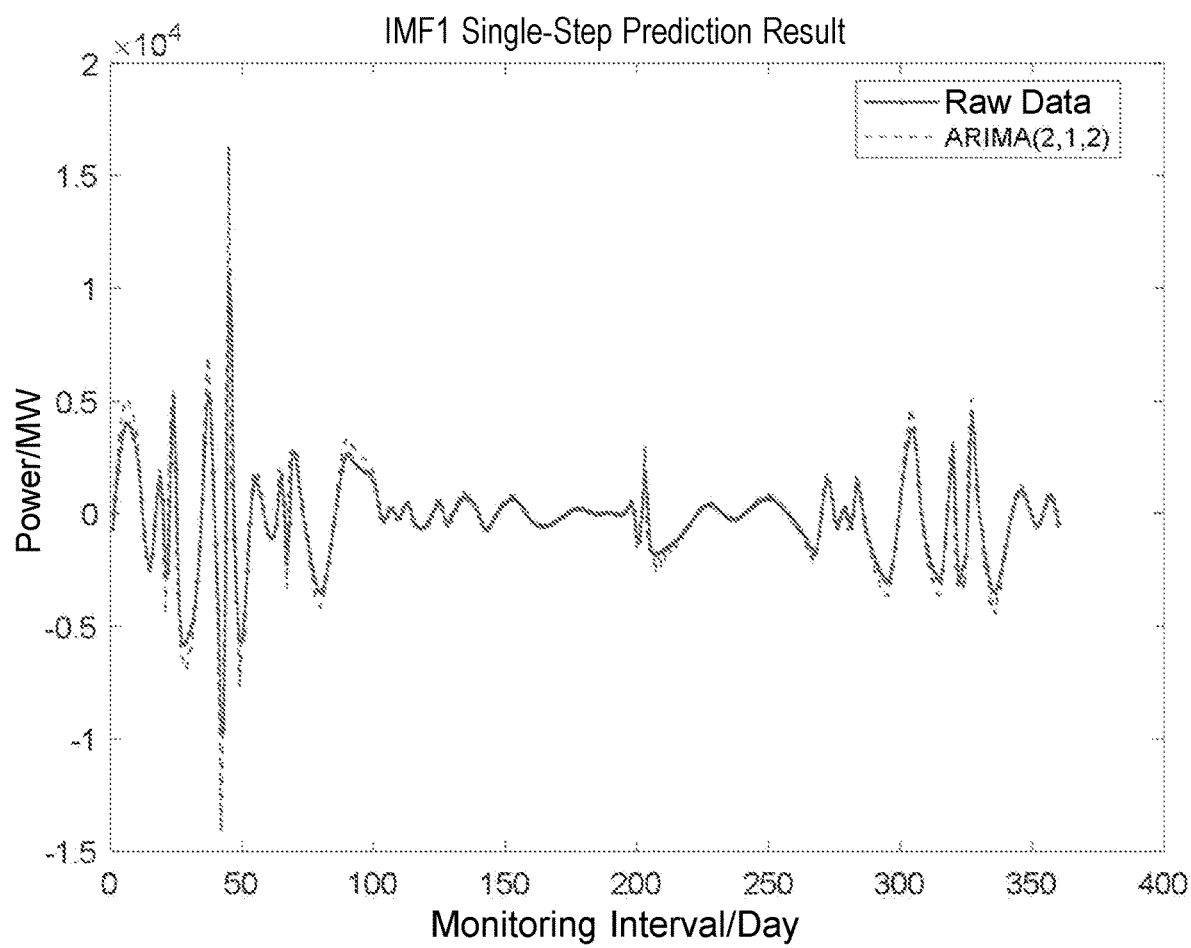
FIG. 5 provides a graph comparing between raw data and prediction results when an ARIMA(2,1,2) model is built for IMF1 for predicting according to an embodiment of the disclosure.

In the embodiments of the disclosure, since a large number of components are required to be predicted, these components may not be described one by one, description of a component IMF1 provided instead. Based on IMF1 data, after AIC and BIC values of different ARIMA models are calculated, Table 1 may be obtained. It can be seen that the ARIMA(2,1,2) model may be selected for IMF1 for prediction (AIC and BIC shall be as less as possible). It can be seen that conditions are satisfied after a residual test is carried out, so it may be used for load component prediction. Similarly, the ARIMA prediction models are built for IMF2 to IMF7 components and residual components, and model parameters corresponding to different components are obtained, as shown in Table 2. Results of prediction performed by building ARIMA(2,1,2) for IMF1 are as shown in FIG. 5.

TABLE 1

AIC and BIC of Different ARIMA Models Built based on IMF1

| Model | AIC | BIC |
|---|---|---|
| ARIMA (0, 1, 0) | 6770.5 | 6777.5 |
| ARIMA (1, 1, 1) | 6485.5 | 6492.6 |
| ARIMA (1, 1, 2) | 6489.7 | 6496.8 |
| ARIMA (1, 2, 1) | 6769.8 | 6776.8 |
| ARIMA (1, 2, 2) | 6881.4 | 6888.4 |
| ARIMA (2, 1, 1) | 6487.3 | 6494.3 |
| ARIMA (2, 1, 2) | 6479.6 | 6486.6 |
| ARIMA (2, 2, 1) | 6590.0 | 6597.1 |
| ARIMA (2, 2, 2) | 6604.2 | 6611.3 |

TABLE 2

Model Selection for Different Components

| Component | ARIMA (p, d, q) |
|---|---|
| IMF1 | ARIMA (2, 1, 2) |
| IMF2 | ARIMA (2, 1, 2) |
| IMF3 | ARIMA (2, 1, 2) |
| IMF4 | ARIMA (2, 2, 2) |
| IMF5 | ARIMA (2, 1, 1) |
| IMF6 | ARIMA (2, 1, 2) |
| IMF7 | ARIMA (2, 1, 2) |
| Residual Component | ARIMA (2, 2, 2) |

In S6, the load components obtained through predicting the different ARIMA models are reconstructed to obtain a final prediction result.

Figure 6:
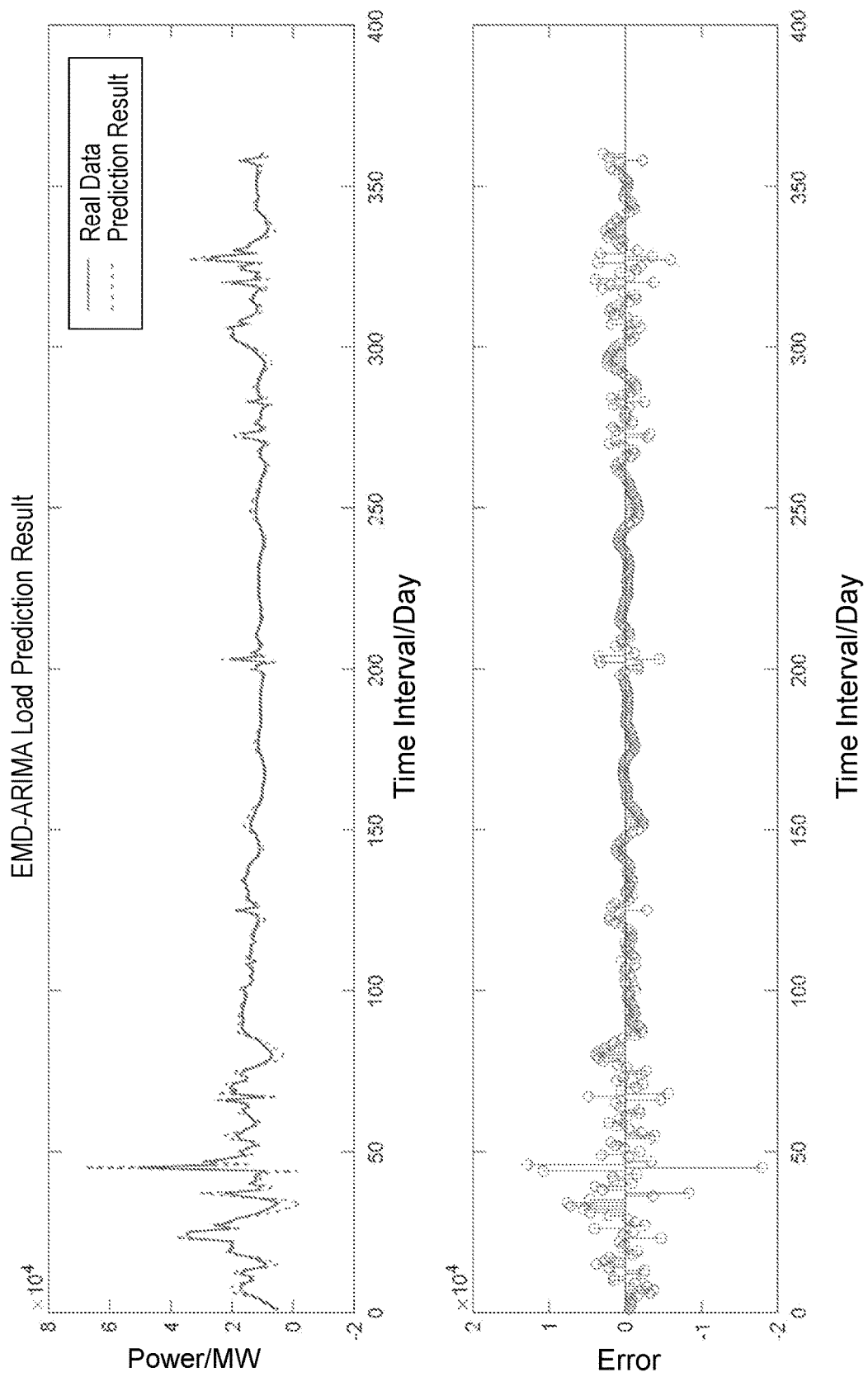
FIG. 6 provides graphs comparing between the raw data and the prediction results when EMD-ARIMA is used for prediction according to an embodiment of the disclosure.

In the embodiments of the disclosure, ARIMA models as shown in Table 2 are built for different components, prediction is made by each of the models, and prediction images are not shown. Finally, EMD inverse reconstruction is performed on all of the prediction results, a specific process may be obtained with reference to the foregoing decomposition process, and the finally-obtained prediction result and errors are shown in FIG. 6. From FIG. 6, it can be directly seen that the raw data is close to the prediction result, but such degree of closeness is required to be further explained through quantitative indicators.

In order to better present the prediction results, in the embodiments of the disclosure, two indicators are selected to evaluate a prediction effect of the models, namely the root mean square error (RMSE):

$$RMSE = \sqrt{\frac{1}{n}\sum_{i=1}^{n}(y_i - \hat{y}_i)^2}$$

and the mean absolute error (MAE):

$$MAE = \frac{1}{n}\sum_{i=1}^{n}|y_i - \hat{y}_i|,$$

where $y_i$ represents the raw data, $\hat{y}_i$ represents the prediction result, and n represents an amount of data.

Since the level of the load data used in the embodiments of the disclosure is large, the large values of RMSE and MAE do not mean that a relative error must be large.

The two indicators predicting the load through the conventional ARIMA models and performing prediction through EMD-ARIMA are calculated, processing results produced with or without the wavelet analysis are also compared, and the final comparison results are shown in Table 3.

TABLE 3

Prediction Indicator Calculation Results through Different Processing Methods

| No. | Model | RMSE | MAE |
|---|---|---|---|
| 1 | ARIMA | 7819.65 | 5106.37 |
| 2 | wavelet noise reduction + ARIMA | 3178.82 | 1538.52 |
| 3 | EMD-ARIMA | 4353.77 | 2859.47 |
| 4 | wavelet noise reduction + EMD-ARIMA | 2198.64 | 1360.42 |

From Table 3, it can be seen that whether it is wavelet noise reduction or prediction parallel with EMD-ARIMA, the final result is significantly affected, and the final prediction effect is effectively improved. Compared to a conventional ARIMA model, the RMSE and MAE in the provided method are reduced by 71.88% and 73.36% respectively, it thus can be seen that prediction errors are significantly reduced.

Figure 7:
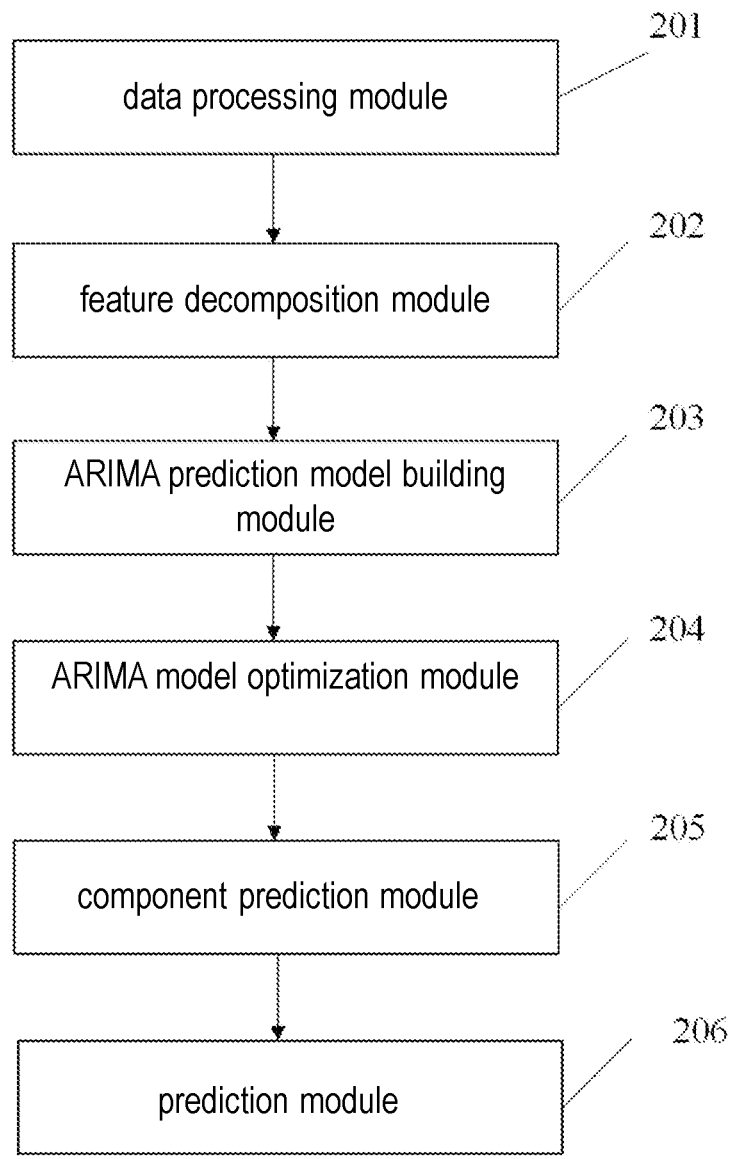
FIG. 7 is a schematic view providing a structure of a system according to an embodiment of the disclosure.

FIG. 7 is a schematic view providing a structure of a system of predicting an electric system load based on wavelet noise reduction and EMD-ARIMA, and the system includes a data processing module 201, a feature decomposition module 202, an ARIMA prediction model building module 203, an ARIMA model optimization module 204, a component prediction module 205, and a prediction module 206.

The data processing module 201 is configured to obtain load data of an electric system and performs wavelet noise reduction processing on the load data.

The feature decomposition module 202 is configured to perform EMD on the wavelet noise-reduced load data and obtains different IMF components and a residual component of the load data.

The ARIMA prediction model building module 203 is configured to build ARIMA models for the different IMF components and the residual component of the load data obtained through EMD.

The ARIMA model optimization module 204 is configured to optimize the ARIMA models of the different IMF components and the residual component.

The component prediction module 205 is configured to perform ARIMA prediction on the different IMF components and the residual component.

The prediction module 206 is configured to synthesize results predicted by the component prediction module 205 to obtain a final load prediction result.

Herein, specific implementation of each of the modules may be found with reference to the description of the method embodiments, and description thereof is not repeated in the embodiments of the disclosure.

In another embodiment of the disclosure, a computer readable storage medium storing a program instruction is also provided. The program instruction implements the method of predicting the electric system load based on wavelet noise reduction and EMD-ARIMA when being executed by a processor according to the method embodiments.

According to the above, the method provided by the disclosure may be accomplished in hardware and firmware, may be implemented as software or a computer code that may be stored in a recording medium (e.g., CD-ROM, RAM, floppy disk, hard disk, or magneto-optical disk), or may be accomplished through a computer code originally stored in a remote recording medium or a non-transitory machine-readable medium through network downloading and to be stored in a local recording medium. In this way, the method described herein may be processed by software stored on a recording medium using a general-purpose computer, a dedicated processor, or programmable or dedicated hardware (e.g., ASIC or FPGA). It may be understood that a computer, a processor, a microprocessor controller, or programmable hardware includes a storage component (e.g., RAM, ROM, flash memory, etc.) that may store or receive software or a computer code. When the software or computer code is accessed and executed by a computer, a processor, or hardware, the processing method described herein is realized. In addition, when a general-purpose computer accesses the code for implementing the processing shown herein, execution of the code converts the general-purpose computer into a dedicated computer for executing the processing shown herein.

Note that according to implementation requirements, each step/part described in the disclosure may be further divided into more steps/parts, or two or more steps/parts or partial operations of a step/part may be combined into a new step/part to accomplish the goal of the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of predicting an electric system load based on wavelet noise reduction and empirical mode decomposition-autoregressive integrated moving average (EMD-ARIMA), adapted to a computer comprising a memory and a processor, wherein the memory storing a program instruction and the processor executing the program instruction to implement the method, wherein the method comprising:
(1) obtaining electric load data of an electric system corresponding to different moments, wherein interpolation is performed on the electric load data to obtain the electric load data provided at equal intervals in response to the electric load data is provided at unequal intervals, wherein the electric load data provided at the equal intervals of the electric system is: data={$a_1$, $a_2$, ..., $a_i$} i∈[1, K], wherein K is K pieces of the electric load data corresponding to K moments, and $a_i$ is a value of an $i^{th}$ point in the electric load data;
(2) performing a wavelet noise reduction process on the electric load data through wavelet analysis, wherein data obtained after the wavelet noise reduction are performed is: x(t)={$x_1$, $x_2$, ..., $x_t$} t∈[1, K], wherein K is K pieces of the electric load data corresponding to K moments, and $x_t$ is a value of a $t^{th}$ point in the electric load data;
(3) further processing the noise-reduced electric load data through an EMD method to obtain different load components, wherein step (3) further comprises:
(3.1) identifying all maximum points and all minimum points in an original series x(t), fitting and forming an upper envelope $x_{up}(t)$ and a lower envelope $x_{low}(t)$ by adopting a cubic spline interpolation method, calculating an envelope mean m(t):

$$m(t) = \frac{x_{up}(t) + x_{low}(t)}{2}$$

of the upper envelope and the lower envelope;
(3.2) calculating and marking a difference value between the original series x(t) and the envelop mean m(t) as: h(t): h(t)=x(t)−m(t);
(3.3) determining whether h(t) satisfies intrinsic mode function (IMF) constraint conditions, treating h(t) as a new input series if no is determined, repeatedly performing step (3.1) to step (3.3) until the IMF constraint conditions are satisfied, treating h(t) as a first IMF component if yes is determined, marking h(t) as $c_1(t)$=h(t), separating $c_1(t)$ from the original series x(t), obtaining a residual component $r_1(t)$: $r_1(t)$=x(t)−$c_1(t)$; and
(3.4) treating the residual component $r_1(t)$ as a new original series, executing step (3.1) again until other IMF components and one residual component are obtained, wherein a final result of EMD is represented as r(t)=x(t)−$c_i(t)$ wherein $c_i(t)$ is an $i^{th}$ IMF component, r(t) is a final residual component representing a trend term of the original series;
(4) building ARIMA models corresponding to the different load components;
(5) optimizing each of the ARIMA models through an Akaike information criterion (AIC) and a Bayesian information criterion (BIC), wherein the each of the ARIMA models is corresponding to each of the different load components; and
(6) reconstructing the different load components obtained by predicting the optimized ARIMA models to obtain a final prediction result.

2. The method according to claim 1, wherein step (2) further comprises:
selecting a wavelet, determining a decomposition level, performing decomposition calculation, selecting a threshold for a high-frequency coefficient under each decomposition scale for soft threshold quantization, and performing one-dimensional wavelet reconstruction based on a lowest low-frequency coefficient of wavelet decomposition and a high-frequency coefficient of each layer.

3. A non-transitory computer readable storage medium, storing a program instruction for causing a computer processor to perform, wherein the program instruction implements the method of predicting the electric system load based on wavelet noise reduction and EMD-ARIMA when being executed by a processor according to claim 2.

4. The method according to claim 1, wherein the IMF constraint conditions are: (a) in an entire series data segment, a number of extreme points and a number of zero-crossing points are required to be identical or be different from each other at most by one, and (b) at any point, the envelop mean of the upper envelope determined by a maximum value and the lower envelope determined by a minimum value is zero.

5. A non-transitory computer readable storage medium, storing a program instruction for causing a computer processor to perform, wherein the program instruction implements the method of predicting the electric system load based on wavelet noise reduction and EMD-ARIMA when being executed by a processor according to claim 4.

6. The method according to claim 1, wherein an ARIMA (p,d,q) model is a combination of an AR(p) model and an MA(q) model, and the ARIMA(p,d,q) model is represented as:

$$x_t = \mu + \sum_{i=1}^{p} \gamma_i x_{t-i} + \xi_t + \sum_{i=1}^{q} \theta_i \xi_{t-i},$$

where $x_t$ is a current value, $\mu$ is a constant term, p is an order, $\gamma_i$ is an autocorrelation coefficient, $\xi_t$ is an error, q is an order, $\theta_i$ is a parameter eliminating random fluctuation, $x_{t-i}$ is a value at a moment t–i, $\xi_{t-i}$ is an error at the moment t–i.

7. The method according to claim 6, wherein step (5) further comprises:
determining a difference order d value corresponding to each of the ARIMA models according to a plurality of differences for each of the ARIMA models, converting each of the ARIMA models into a corresponding autoregressive moving average (ARMA) model; and
performing ordering on a load component corresponding to each of the ARMA models through an autocorrelation function (ACF) and a partial autocorrelation function (PACF) for each of the ARMA models, obtaining a plurality groups of p and q values, optimizing the plurality groups of the ARMA models through AIC and BIC corresponding to the plurality groups of the ARMA models, obtaining the ARIMA model corresponding to each of the load component, wherein if a value calculated through the two parameters AIC and BIC decrease, meaning that the model is suitable.

8. A non-transitory computer readable storage medium, storing a program instruction for causing a computer processor to perform, wherein the program instruction implements the method of predicting the electric system load based on wavelet noise reduction and EMD-ARIMA when being executed by a processor according to claim 7.

9. A non-transitory computer readable storage medium, storing a program instruction for causing a computer processor to perform, wherein the program instruction implements the method of predicting the electric system load based on wavelet noise reduction and EMD-ARIMA when being executed by a processor according to claim 6.

10. A non-transitory computer readable storage medium, storing a program instruction for causing a computer processor to perform, wherein the program instruction implements the method of predicting the electric system load based on wavelet noise reduction and EMD-ARIMA when being executed by a processor according to claim 1.

11. A system of predicting an electric system load based on wavelet noise reduction and empirical mode decomposition-autoregressive integrated moving average (EMD-ARIMA), comprising:

a memory, configured to store a program instruction; and
a processor, coupled to the memory and configured to execute the program instruction to:
obtain electric load data of an electric system corresponding to different moments, wherein interpolation is performed on the electric load data to obtain the electric load data provided at equal intervals in response to the electric load data is provided at unequal intervals, wherein the electric load data provided at the equal intervals of the electric system is: data={$a_1, a_2, \ldots, a_i$} i∈[1, K], wherein K is K pieces of the electric load data corresponding to K moments, and $a_i$ is a value of an $i^{th}$ point in the electric load data;
perform a wavelet noise reduction process on the electric load data through wavelet analysis, wherein data obtained after the wavelet noise reduction are performed is: x(t)={$x_1, x_2, \ldots x_t$} t∈[1, K], wherein K is K pieces of the electric load data corresponding to K moments, and $x_t$ is a value of a $t^{th}$ point in the electric load data;
identify all maximum points and all minimum points in an original series x(t), fitting and forming an upper envelope $x_{up}(t)$ and a lower envelope $x_{low}(t)$ by adopting a cubic spline interpolation method, calculating an envelope mean m(t):

$$m(t) = \frac{x_{up}(t) + x_{low}(t)}{2}$$

of the upper envelope and the lower envelope;
calculate and mark a difference value between the original series x(t) and the envelop mean m(t) as: h(t): h(t)=x(t)−m(t);
determine whether h(t) satisfies intrinsic mode function (IMF) constraint conditions, treat h(t) as a new input series if no is determined;
treating h(t) as a first IMF component if yes is determined, marking h(t) as $c_1(t)$=h(t), separating $c_1(t)$ from the original series x(t), obtaining a residual component $r_1(t)$: $r_1(t)$=x(t)−$c_1(t)$ in response to the IMF constraint conditions are satisfied;
treat the residual component $r_1(t)$ as a new original series to obtain other IMF components and one residual component, wherein a final result of EMD is represented as r(t)=x(t)−$c_i(t)$, wherein $c_i(t)$ is an $i^{th}$ IMF component, r(t) is a final residual component representing a trend term of the original series;
build ARIMA models for the different IMF components and the residual component of the load data obtained through EMD;
optimize each of the ARIMA models of the different IMF components and the residual component;
perform ARIMA prediction on the different IMF components and the residual component obtained through optimization; and
synthesize results predicted to obtain a final load prediction result.

\* \* \* \* \*